United States Patent Office 3,137,735
Patented June 16, 1964

3,137,735
PROCESS FOR SYNTHESIS FOR MERCAPTANS
Paul F. Warner and Richard D. Franz, Phillips, Tex.,
assignors to Phillips Petroleum Company, a corporation
of Delaware
No Drawing. Filed Oct. 20, 1961, Ser. No. 146,458
7 Claims. (Cl. 260—609)

This invention relates to an improved process for preparing mercaptans by reacting an olefin with $H_2S$ utilizing a novel catalyst, and to the novel catalyst for the process.

The synthesis of mercaptans by reacting $H_2S$ with an olefin is a conventional process. When utilizing relatively high molecular weight olefins, such as those containing from 9 to 16 carbon atoms per molecule, conducting the reaction at usual reaction temperatures with the conventional catalyst, $H_3PO_4 \cdot BF_3$, the yield of high molecular weight mercaptans is substantially reduced by fracturing of the olefins and production of a substantial proportion of lower molecular weight mercaptans. To illustrate, when reacting triisobutylene with $H_2S$ to produce tertiary dodecyl mercaptan, a substantial amount of butyl and octyl mercaptans are produced. However, reduction of the temperature of the reaction below that at which fracturing of the heavy olefin is avoided results in low yield due to low activity of the catalyst $H_3PO_4 \cdot BF_3$ at low temperatures. This invention is concerned with a more active catalyst for mercaptan synthesis at low temperatures.

Accordingly, it is an object of the invention to provide a process for preparing mercaptans utilizing an improved catalyst. Another object is to produce mercaptans in improved yields at low temperatures. A further object is to provide an improved catalyst for the synthesis of mercaptans and by reacting $H_2S$ and an olefin. It is also an object of the invention to provide an improved process for the synthesis of mercaptans containing from 9 to 16 carbon atoms per molecule with improved yield at low temperature. An additional object is to provide an improved catalyst containing the complex $H_3PO_4 \cdot BF_3$ or $H_3PO_3 \cdot BF_3$ which is more effective at low temperatures than this complex alone. Other objects of the invention will become apparent to one skilled in the art upon consideration of the accompanying disclosure.

A broad aspect of the invention comprises a catalyst consisting essentially of a liquid complex of an oxygen-containing acid of phosphorus, an alcohol of 1 to 5 carbon atoms, and $BF_3$. This catalyst is prepared by mixing the acid and the alcohol and adding $BF_3$ to the mixture, preferably to saturate the mixture with $BF_3$ for highest activity of the catalyst. The preferred acid is $H_3PO_4$ but $H_3PO_3$ is also effective. (It is to be understood that where the ensuing disclosure refers to $H_3PO_4$ or phosphoric acid, $H_3PO_3$ or phosphorus acid may be used.) The concentration of phosphoric acid is not critical and the commercially available grade of 85% concentration is generally used. However, concentrations in the range of 40 to 100% are effective.

The alcohols useful in the catalyst are the $C_1$ to $C_5$ alcohols including ethyl, methyl, propyl, butyl, and the amyl alcohols. The ratio of alcohol to the acid in the mixture is in the range of 1:9 to 1:1 by weight to be most effective. However, proportions outside of this range have some advantage in the catalyst. The $BF_3$ should be added to the liquid mixture of acid and alcohol to the saturation point to provide the most active catalyst, but lesser amounts produce a catalyst of proportionately less activity.

Another aspect of the invention comprises reacting $H_2S$ with an olefinic hydrocarbon in admixture with the $H_3PO_4 \cdot BF_3$ alcohol complex to produce the corresponding mercaptan. This process produces high yield of mercaptan, particularly, at temperatures in the range of —90 to 0° F. and preferably in the range of —60 to —20° F. The process is conducted at pressures sufficient to maintain the reactants in liquid phase at reaction temperatures. Pressure depends upon the reactant mixture but pressures in the range of about 50 to 500 p.s.i.g. are generally suitable. Conventional mol ratios of $H_2S$ to olefin such as 1:1 to 6:1 and preferably 2:1 to 5:1 may be used. The volume ratio of hydrocarbon feed to catalyst is in the range of about 5:1 to 15:1.

The olefinic hydrocarbons which may be reacted with hydrogen sulfide in carrying out this invention are those containing at least one ethylenic bond, and include aliphatic olefins, cyclic olefins, and substituted aliphatic and cyclic olefins in which the substituting group or groups may be hydrocarbon or non-hydrocarbon radicals of such character that they do not interfere with the primary reaction. Typical olefins include ethylene, butylenes, cyclohexene, triisobutylene, and other $C_9$ to $C_{16}$ olefins.

Tertiary dodecyl mercaptan made from triisobutylene is particularly useful as a rubber modifier. Numerous synthesis runs have been made reacting triisobutylene with $H_2S$ in admixture with $H_3PO_4 \cdot BF_3$ catalyst and with $H_3PO_4 \cdot BF_3 \cdot CH_3OH$. The following examples illustrate the use of the conventional catalyst $H_3PO_4 \cdot BF_3$ and the catalyst of the invention in these runs.

EXAMPLE I

Triisobutylene was reacted with hydrogen sulfide in admixture with boron trifluoride-phosphoric acid catalyst made by saturating 85% phosphoric acid with boron trifluoride. The $BF_3$ content of the catalyst was about 55 weight percent. The feed stock was prepared by blending the triisobutylene with hydrogen sulfide in a steel cylinder fitted with an eductor tube. The feed was metered with a Lapp pump through a pressure controlled relief valve into the reactor containing the catalyst. The effluent passed through the phase separator and through another pressure controlled relief valve where the excess hydrogen sulfide flashed out. The crude mercaptan was collected in 1000 ml. cuts.

Synthesis conditions observed throughout the various four pass operations were as follows: hydrogen sulfide to olefin mole ratio of about 1.5; hydrocarbon to catalyst volume ratio in the reactor, about 9; feed rate of 1000-ml. of liquid effluent per hour; and pressure 350 p.s.i.g. This pressure was chosen as being high enough to keep the reactants in liquid phase at all of the temperatures tested.

The liquid hydrocarbon effluent was cut into three fractions, $C_4$ and $C_8$ mercaptans (IBP to 340 F.), recycle TIB (340 to 400 F.), and crude $C_{12}$ mercaptan (kettle product) in a Vigreaux column. The crude $C_{12}$ mercaptan was further purified by distillation in a ¾-inch O.D. by 4-foot long, spinning band column. The unreacted olefin from the first pass was recycled with fresh $H_2S$ to the second pass. The unreacted olefin from the second pass was recycled with $H_2S$ to the third pass, etc., for four passes.

Data obtained in the runs are presented in Table I.

Table 1

| Reaction Temperature, ° F. | Olefin Conversion Per Pass | Dodecyl Mercaptan Yield, mole percent | |
|---|---|---|---|
| | | Per Pass | Ultimate |
| 100 | 20–27 | 9–13 | 40–50 |
| 40 | 17–22 | 10–18 | 70–80 |
| 0 | 25–30 | 23–25 | 85–90 |
| —40 | 10–20 | 10–18 | 80–90 |

EXAMPLE II

A batch of catalyst was made using a mixture of methanol (75 ml.) and $H_3PO_4$ (175 ml.) and this mixture was then saturated with $BF_3$. The resulting catalyst was then utilized in the synthesis of tertiary dodecyl mercaptan from triisobutylene and $H_2S$ under the same conditions as utilized in Example I at a temperature of $-40°$ F. Comparison of the two catalysts is made in Table II.

*Table II*

| Catalyst Component | Weight percent | |
| --- | --- | --- |
| | $BF_3 \cdot H_3PO_4$ | $BF_3 \cdot H_3PO_4 \cdot CH_3OH$ |
| $H_3PO_4$ (85%) | 45 | 37 |
| Methanol | — | 7 |
| $BF_3$ | 55 | 56 |

The yield per pass obtained with the $$BF_3 \cdot H_3PO_4 \cdot CH_3OH$$

was 20 mol percent and the ultimate yield of tertiary dodecyl mercaptan was 87 mol percent. This run demonstrates the more effective character of the catalyst of the invention at low temperatures, such as $-40°$ F., as compared with $BF_3 \cdot H_3PO_4$ catalyst.

The $BF_3$ in the catalyst forms a complex with both the $H_3PO_4$ and the alcohol and the alcohol renders the catalyst complex less viscous than the $H_3PO_4 \cdot BF_3$ complex.

Certain modifications of the invention will become apparent to those skilled in the art and the illustrative details disclosed are not to be construed as imposing unnecessary limitations on the invention.

We claim:

1. A process for preparing a mercaptan which comprises contacting a $C_9$ to $C_{16}$ olefin hydrocarbon with hydrogen sulfide in admixture with a catalyst system consisting essentially of $BF_3 \cdot H_3PO_4 \cdot ROH$ wherein R is alkyl of 1 to 5 carbon atoms under reaction conditions including a temperature in the range of $-90°$ to $0°$ F. and sufficient pressure to maintain the reactants in liquid phase such that mercaptan is formed.

2. The process of claim 1 wherein said olefin comprises triisobutylene and dodecyl mercaptan is formed.

3. The process of claim 1 wherein R is $CH_3$.

4. The process of claim 1 wherein the ratio of alcohol to phosphoric acid is in the range of 1:9 to 1:1 by weight and the phosphoric acid-alcohol mixture is saturated with $BF_3$.

5. The process of claim 1 wherein the temperature of contacting is in the range of $-60°$ to $-20°$.

6. A process for preparing tertiary dodecyl mercaptan which comprises reacting triisobutylene with hydrogen sulfide in admixture with a catalyst system comprising a mixture of an oxygen-containing acid of phosphorus and a $C_1$ to $C_5$ alcohol in a weight ratio of alcohol to acid in the range of 1:9 to 1:1 saturated with $BF_3$, at a reaction temperature in the range of $-90$ to $0°$ F. so as to form said mercaptan; and recovering said mercaptan.

7. The process of claim 6 wherein said acid is $H_3PO_4$, said alcohol is methanol, and the methanol-$H_3PO_4$ ratio is a weight ratio in the range of 1:4 to 2:3.

References Cited in the file of this patent

UNITED STATES PATENTS

| 2,137,584 | Ott | Nov. 22, 1938 |
| 2,390,099 | Harmon | Dec. 4, 1945 |
| 2,426,647 | Schulze et al. | Sept. 2, 1947 |
| 2,470,175 | Linn | May 17, 1949 |
| 2,491,116 | Kraus et al. | Dec. 13, 1949 |
| 2,498,872 | Bell et al. | Feb. 28, 1950 |
| 2,502,596 | Schultz | Apr. 4, 1950 |
| 2,865,965 | May et al. | Dec. 23, 1958 |
| 2,943,063 | Eby et al. | June 28, 1960 |

FOREIGN PATENTS

| 501,697 | Canada | Apr. 20, 1957 |